(12) United States Patent
Carter

(10) Patent No.: US 6,190,628 B1
(45) Date of Patent: Feb. 20, 2001

(54) METHOD FOR INJECTING $NO_x$ INHIBITING LIQUID REAGENT INTO THE FLUE GAS OF A BOILER IN RESPONSE TO A SENSED TEMPERATURE

(75) Inventor: H. Randy Carter, Lancaster, OH (US)

(73) Assignee: Diamond Power International, Inc., Lancaster, OH (US)

( * ) Notice: Under 35 U.S.C. 154(b), the term of this patent shall be extended for 0 days.

(21) Appl. No.: 08/266,809

(22) Filed: Jun. 28, 1994

Related U.S. Application Data

(62) Division of application No. 08/054,924, filed on Apr. 30, 1993, now Pat. No. 5,326,536.

(51) Int. Cl.[7] .................................................. B01J 10/00
(52) U.S. Cl. ................ 423/235; 423/239.1; 110/190; 110/215; 110/345; 239/75; 122/40; 422/111; 422/123; 422/168; 422/176; 422/182
(58) Field of Search .............................. 423/235, 239.1; 422/111, 168, 176; 239/75; 122/40; 110/190, 215

(56) References Cited

U.S. PATENT DOCUMENTS

| 4,208,386 | * | 6/1980 | Arand et al. | 423/235 |
| 4,842,834 | * | 6/1989 | Burton | 423/235 |
| 4,915,036 | * | 4/1990 | DeVita | 110/215 |
| 4,985,218 | * | 1/1991 | DeVita | 423/235 |
| 5,286,458 | * | 2/1994 | Yang et al. | 422/168 |

* cited by examiner

Primary Examiner—Linda L Gray
(74) Attorney, Agent, or Firm—Robert J. Edwards

(57) ABSTRACT

A method and apparatus for optimizing the injecting of $NO_x$ inhibiting liquid reagent into the flue gas of a utility or industrial type boiler to reduce emissions of $NO_x$ including a temperature sensor for measuring the boiler flue gas temperature and a moveable conduit for injecting the $NO_x$ inhibiting reagent into the flue gas at a sensed predetermined temperature range.

4 Claims, 2 Drawing Sheets

METHOD FOR INJECTING $NO_x$ INHIBITING LIQUID REAGENT INTO THE FLUE GAS OF A BOILER IN RESPONSE TO A SENSED TEMPERATURE

This application is a Division of application Ser. No. 08/054,924, filed Apr. 30, 1993, now U.S. Pat. No. 5,326,536.

FIELD AND BACKGROUND OF THE INVENTION

The present invention relates to a method and apparatus for injecting $NO_x$ inhibiting liquid reagent into the flue gas of a boiler, in order to reduce the emission of $NO_x$.

$NO_x$ emissions are a common problem encountered during the operation of boilers due to extremely high temperatures involved in boiler operation. Concern for the environment has resulted in the development of several methods and devices to combat the $NO_x$ pollutant problem.

U.S. Pat. No. 4,208,386 discloses a process for reducing $NO_x$ emissions found in combustion effluent, through the use of urea or a urea solution sprayed onto the flue gas having a temperature window of 1300° F. to 2000° F. It has been found that $NO_x$ control is best if the reagent is sprayed within this temperature window.

U.S. Pat. No. 4,842,834 discloses a process and apparatus for reducing the concentration of pollutants in flue gas due to combustion of the fuel. An effluent treatment fluid is injected at independently variable droplet sizes and distances into a wide variety of distribution patterns within the flue gas passage. An atomization conduit extends into the flue gas and is positioned coaxially around a treatment fluid conduit to supply an atomization fluid.

U.S. Pat. No. 4,985,218 discloses a process and apparatus for reducing $NO_x$ concentrations in a flue gas from a combustion chamber. The process and apparatus enable the injection of a flue gas treatment fluid at a low treatment fluid flow rate, yet provide an even dispersion of treatment fluid within the flue gas passage with little or no clogging. An atomization conduit, positioned coaxially within a treatment fluid supply conduit, extends into the flue gas and supplies an atomization fluid, such as steam or air. A treatment fluid is supplied through a conduit and through at least one jet in the atomization conduit wall at a velocity of between 2 to 60 feet per second, causing atomization of the treatment fluid within a nozzle. The treatment fluid used to reduce $NO_x$ emissions is preferably comprised of an aqueous solution of urea, ammonia, nitrogenated hydrocarbon, oxygenated hydrocarbon, hydrocarbon or combinations thereof.

U.S. Pat. No. 5,058,514 discloses a process for controlling acid gas emissions in flue gases. An in-furnace injection process is used to control both $SO_2$ and $NO_x$ emission from the flue gases. An aqueous solution aimed at reducing the pollutants is injected into the furnace at a temperature range or window between 900° C. to 1350° C. At optimal operating conditions, about 80% of the $SO_2$ and 90% of the $NO_x$ are removed. Similarly, urea has been found to be the preferred nitrogenous progenitor additive. The urea can be injected in a cross current, concurrent or counter current direction to the flue gas flow.

On most occasions, the ability to inject the reactant into a specified temperature window has presented several application problems. One such problem is caused due to the appropriate temperature window moving upstream gas flowwise with a decrease in boiler load and downstream with an increase in load. Due to varying load changes within the boiler, a given flue gas temperature will move back and forth in relation to boiler load changes. Thus, varying boiler load causes a shifting of temperatures within the flue gas passageways so that injection may not take place at the appropriate flue gas temperature.

SUMMARY OF THE INVENTION

The present invention is a method and apparatus for injecting $NO_x$ inhibiting liquid reagent into the flue gas of a utility or industrial type boiler, in order to reduce the emission of $NO_x$.

The main goal of the present invention is to enable $NO_x$ liquid reagent to be used in the appropriate temperature window, the most efficient location within the flue gas passageways, in order to maximize pollution control efficiency. The present invention achieves this goal by employing a conduit and spray nozzle that is normally retracted from the harsh environment of the boiler and inserted into the flue gas passageways in order to spray a liquid reagent aimed at reducing $NO_x$ emissions from a boiler only when a temperature sensor, operatively located at the conduit entrance to the flue gas passageway, senses the optimum temperature for reagent injection. Urea is one such $NO_x$ inhibiting liquid reagent that can be used to reduce pollutants. The temperature sensor is an optical temperature monitor positioned at the conduit entrance to the flue gas passageway in order to continuously monitor the flue gas temperature when the conduit is in the retracted position.

The temperature sensor relays the temperature within the flue gas passageway to a control device. In turn, the control device commands drive means that are responsible for the moving of the conduit and urea spray nozzle into the flue gases when the temperature window is found to be in the range of 1600–1900° F. which is the optimal reagent spraying temperature within the flue gas passageway. This insures an efficient uniform $NO_x$ emission reduction because the conduit is normally retracted from the harsh temperature environment of the boiler. Also, during the injection of urea into the flue gases, the conduit is continuously moving during its reciprocating cycle to prevent warping of the conduit. The various features of the novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
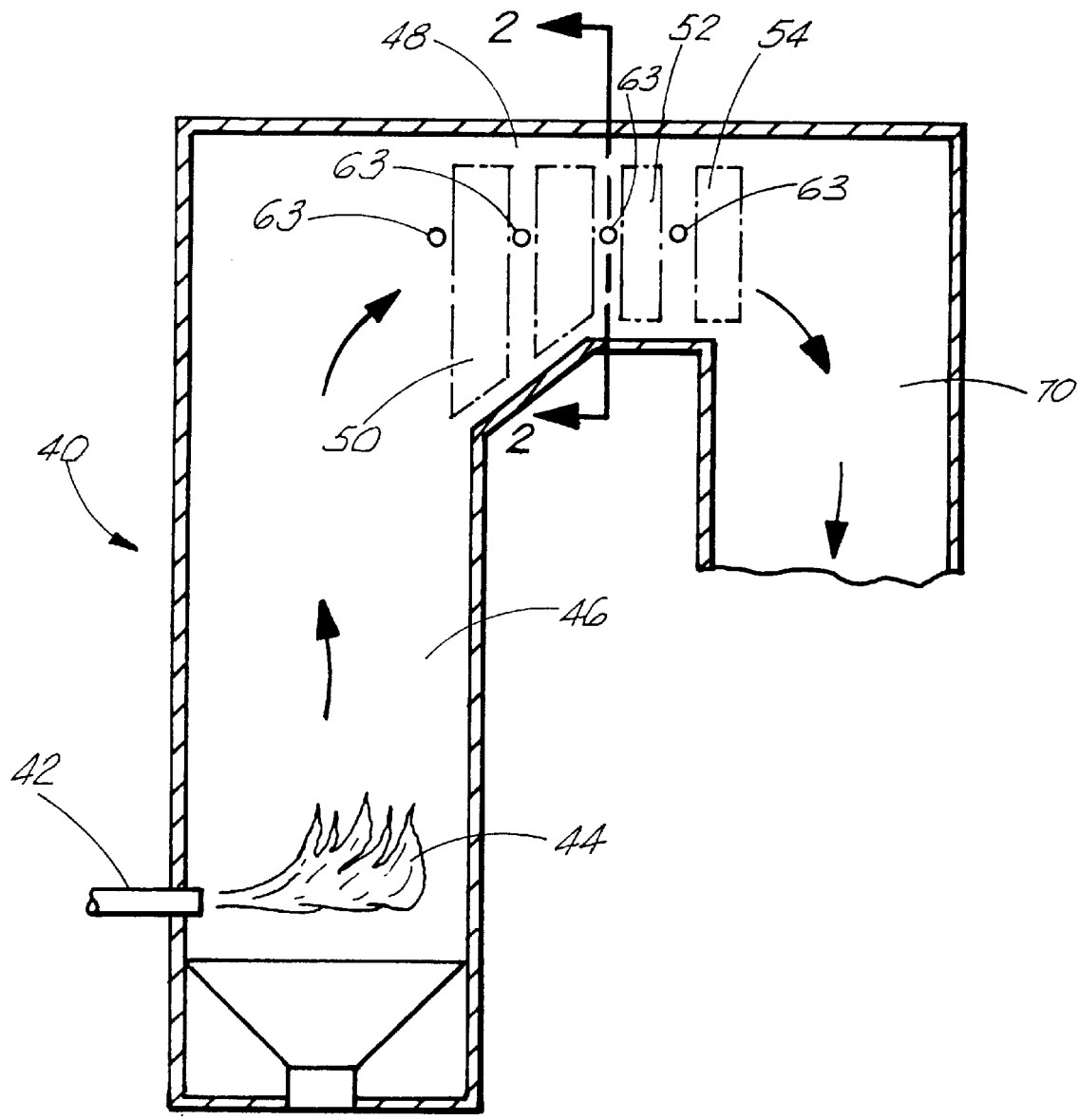
FIG. 1 is a side sectional view of a utility or industrial boiler embodying the present invention.

Referring to the drawings in particular, the invention embodied in FIG. 1 comprises a utility or industrial boiler 40 containing multiple burners shown as a single burner 42, located in a water tube wall lined furnace chamber 46. In the normal operation of the boiler 40, combustion air and fuel are supplied to the burner 42, and the fuel is burned as shown at 44 in the lower portion of furnace space 46. Heating gases flow upwardly through space 46, thence to a convection pass or passage 48 and then successively over and between the tubes of a secondary superheater 50, a reheater 52, and a primary superheater 54 and downwardly through a gas passageway 70. The economizer, air heater, dust collector and stack successively located downstream gas flow-wise in and from the passageway 70 and normally associated with a utility or industrial boiler are not shown. It should be recognized that in accordance with well-known practice, the secondary superheater 50, the reheater 52 and the primary superheater 54 extend across the full width of the convection pass 48 and are formed for serial flow of steam by multiple looped tubes. Wall openings 63 provide an access or entrance to the boiler flue gas passageway known as the convection pass 48.

Figure 2:
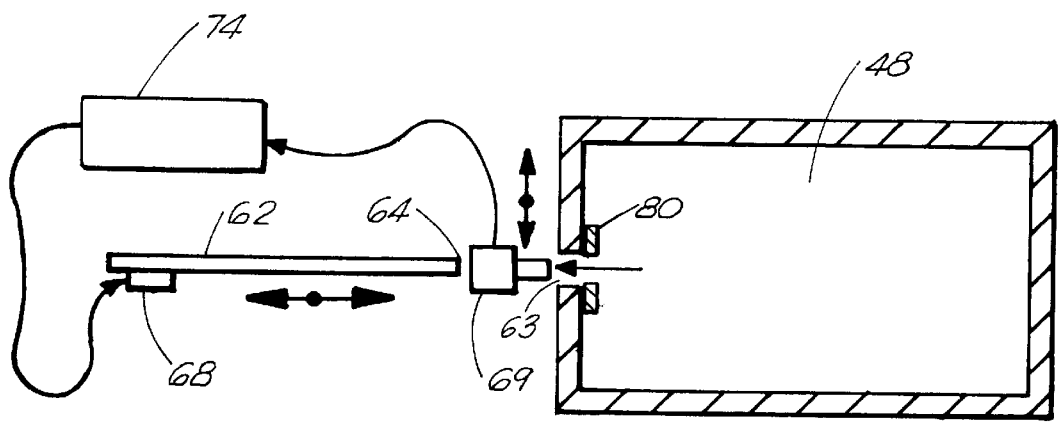
FIG. 2 is a cross-sectional view, taken at line 2—2 in FIG. 1, depicting the temperature sensor in its operative position and the conduit and spray nozzle in its retracted position.
Figure 3:
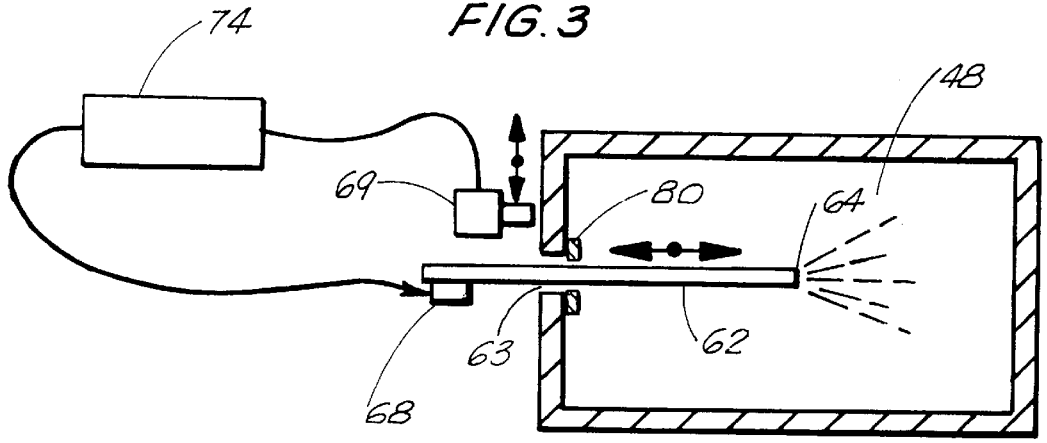
FIG. 3 is the cross-sectional view shown at FIG. 2 with the temperature sensor in its retracted position and the conduit and spray nozzle operating within the boiler.

In accordance with the present invention, as shown at FIGS. 2 and 3, there are provided at each wall opening 63, a liquid $No_x$ inhibitor conduit 62 and a temperature sensor 69. A slide seal 80 is located in each wall opening 63 so that conduit 62 can be slideably inserted into and out of the convection pass 48. A nozzle 64 is located on the outlet end of conduit 62 in order to spray a liquid $No_x$ inhibitor reagent into the flue gases flowing through the convection pass 48.

The gas temperature sensor 69 is operatively positioned, as shown at FIG. 2, at the wall opening 63 and is used to monitor the flue gas temperature and locate the proper temperature window, preferably about 1600–1900° F., within the convection pass 48. As the temperature sensor 69 monitors the flue gas temperature within the convection pass 48, it relays the temperature reading to a control means 74. Based on the temperature reading relayed from the temperature sensor 69 to the control means 74, the control means will activate a drive 68 which is responsible for moving the liquid $NO_x$ inhibitor conduit 62 in order to position nozzle 64 into the convection pass 48 so as to spray reagent into the flue gases.

The seal 80 may be of any conventional type and may be established, for example, by directing a continuous stream of air around and against the conduit 62 and into the convection pass 48 to substantially preclude any leaking of flue gases from the convection pass 48, around the slideable mounted conduit 62.

The temperature sensor 69 is an optical temperature monitor sold by Diamond Power Specialty Company of Lancaster, Ohio.

FIG. 2 shows the temperature sensor 69 positioned adjacent the wall opening 63 for continuously monitoring the temperature of the flue gases flowing across the sensing path in the convection pass 48. When the preferred temperature range of 1600–1900° F. is sensed thereby activating the liquid $No_x$ inhibitor conduit drive 68, the temperature sensor 69 is moved away from the wall opening 63 by drive means, not shown, so as to allow the conduit to be slideably inserted into the boiler convection gas pass 48 and thus enable nozzle 64 to spray the reagent into the flue gases as shown at FIG. 3.

Although the conduit 62, as shown at FIGS. 2 and 3, is mounted for movement in a direction perpendicular to the direction of flow of flue gases, it should be recognized that the conduit may be mounted for movement at an angle or in a curved path. The motion must be generally along the path of temperature change. It should be further recognized that comminuted solids or gaseous reagents may be substituted for the liquid reagent used in conjunction with the invention.

While the specific embodiments of the invention have been shown and described in detail to illustrate the application of the principles of the invention, it will be understood that the invention may be embodied otherwise without departing from such principles.

What is claimed:

1. A method for injecting $NO_x$ inhibiting liquid reagent into a boiler having boiler gas flowing therein in a direction of flow, the boiler including an opening, the method comprising:

mounting a conduit having a nozzle, the conduit being activable for injecting $NO_x$ inhibiting reagent, and mounting the conduit such that the conduit and nozzle are movable into the gas in the boiler through the opening and movable out of the gas and out of the opening;

sensing a temperature of the gas in the boiler;

when the temperature of the gas is sensed to be within a selected range, activating the conduit to insert the nozzle into the gas through the opening and activating the conduit to spray reagent through the nozzle into the gas; and when the temperature of the gas is sensed to be outside the selected range, activating the conduit to withdraw the nozzle from the gas and out of the opening, and deactivating the conduit so that no reagent is supplied through the conduit to the nozzle.

2. A method according to claim 1 including activating the conduit to insert the nozzle in response to a sensed selected temperature range of about 1600°–1900° F.

3. A method according to claim 1, wherein the conduit and nozzle are moved parallel to the direction of gas flow.

4. A method according to claim 3, including activating the conduit to insert the nozzle in response to a sensed selected temperature range of about 1600°–1900° F.

* * * * *